B. DAY.
FILM FRAME APPARATUS.
APPLICATION FILED MAY 25, 1911.
1,063,016.
Patented May 27, 1913.
3 SHEETS—SHEET 1.
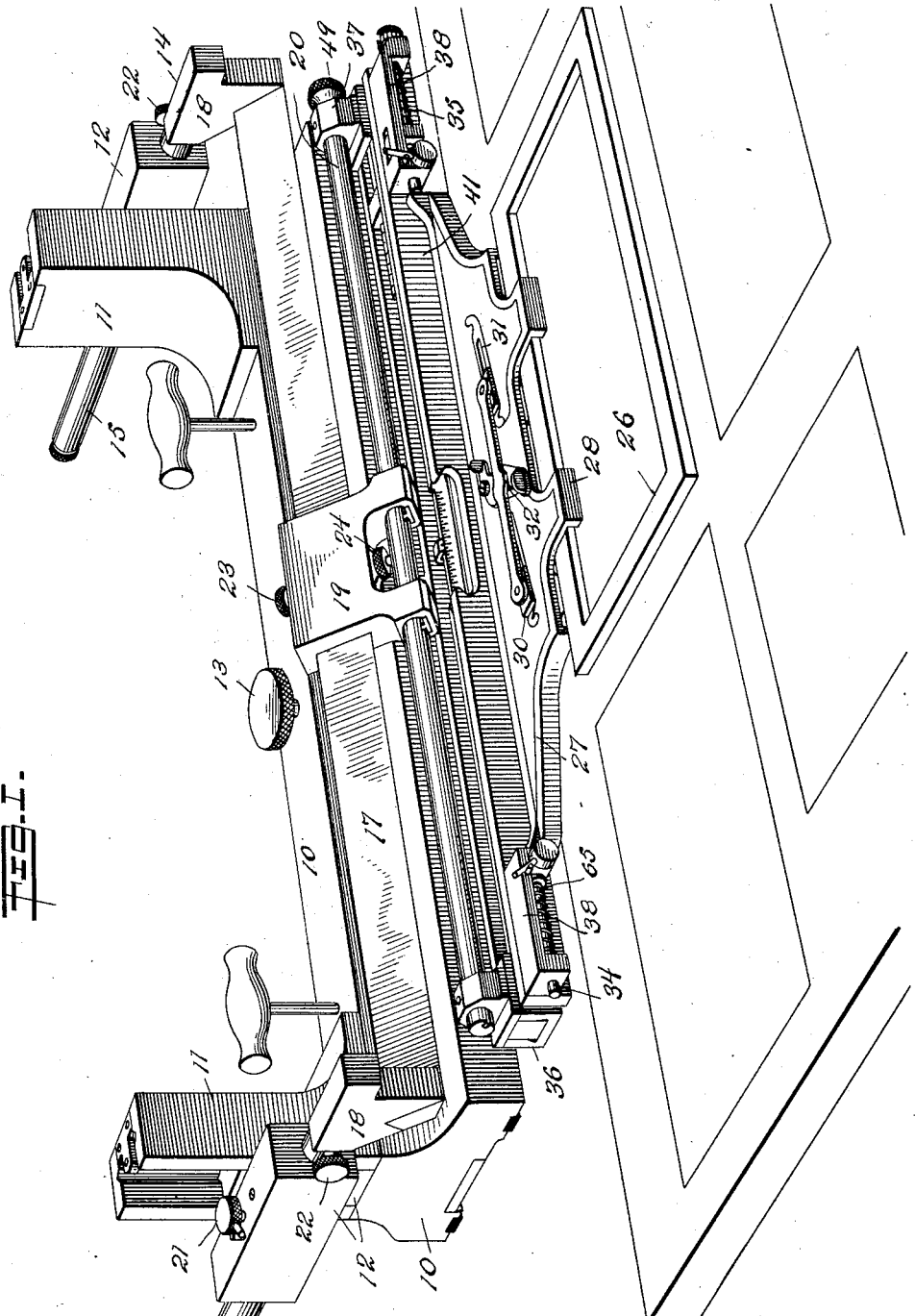

B. DAY.
FILM FRAME APPARATUS.
APPLICATION FILED MAY 25, 1911.
1,063,016.
Patented May 27, 1913.
3 SHEETS—SHEET 2.
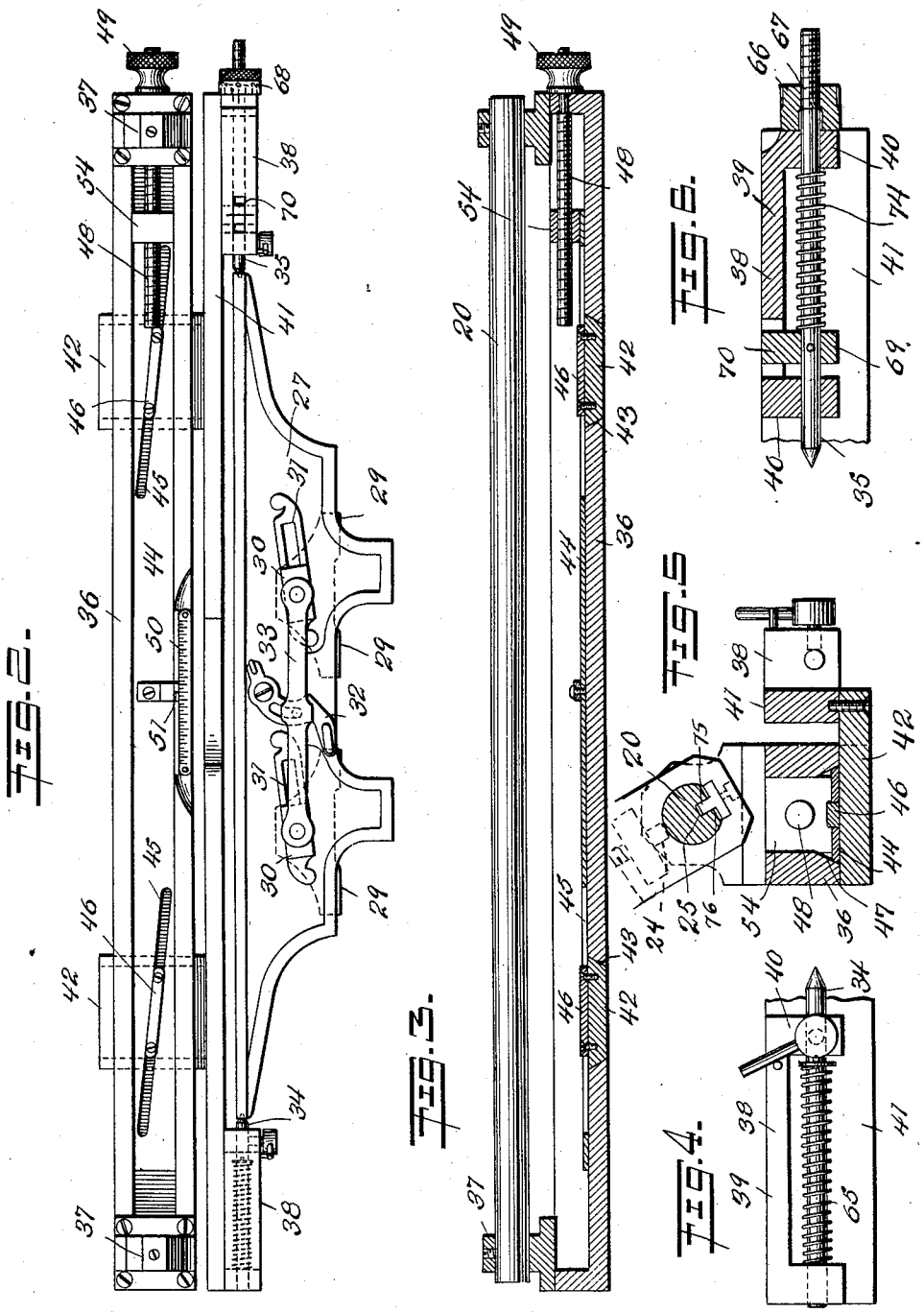

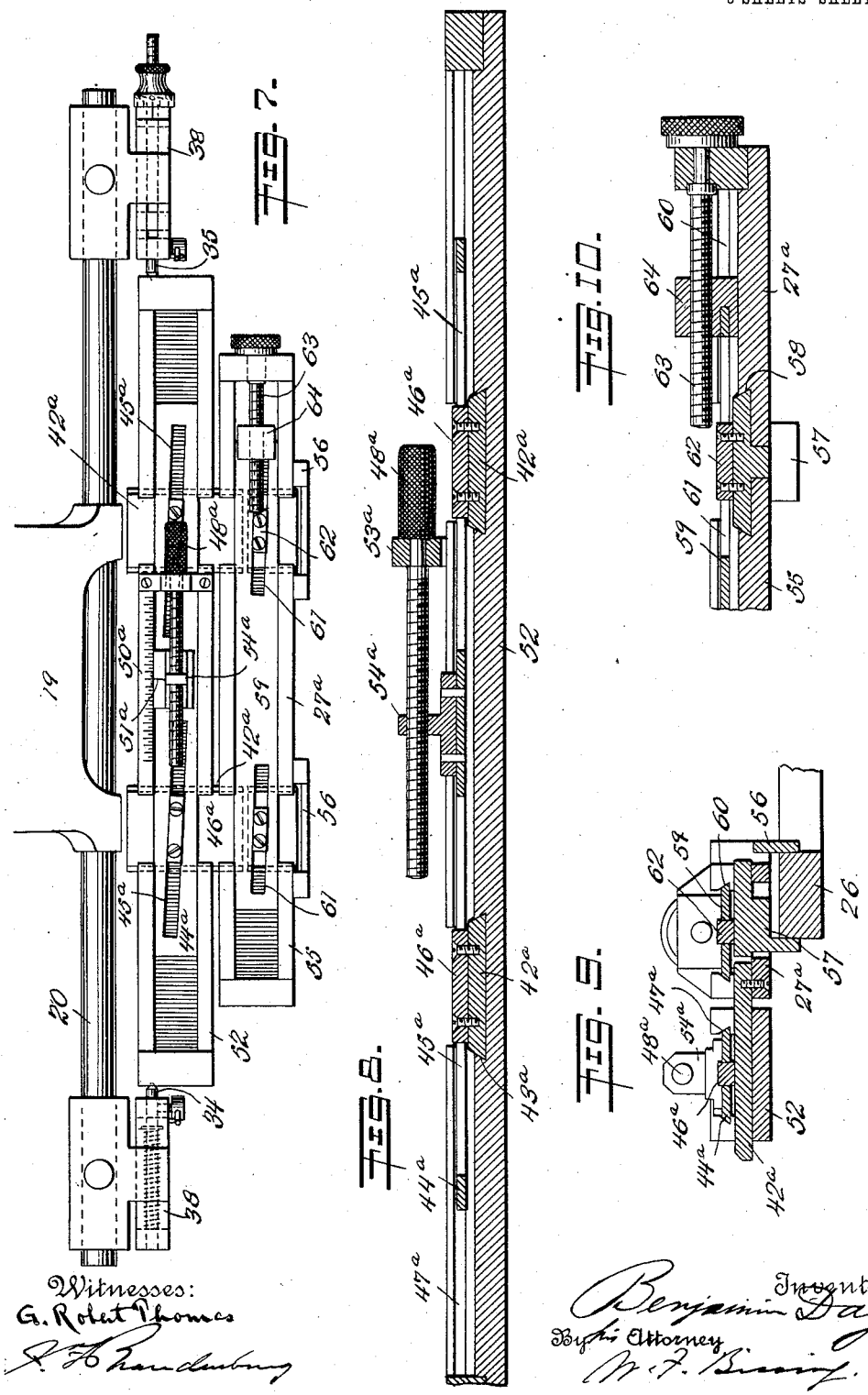

UNITED STATES PATENT OFFICE.

BENJAMIN DAY, OF SUMMIT, NEW JERSEY.

FILM-FRAME APPARATUS.

1,063,016. Specification of Letters Patent. Patented May 27, 1913.

Application filed May 25, 1911. Serial No. 629,281.

*To all whom it may concern:*

Be it known that I, BENJAMIN DAY, a citizen of the United States, and a resident of Summit, Union county, New Jersey, have invented certain new and useful Improvements in Film-Frame Apparatus, of which the following is a specification.

This invention relates to micrometric apparatus for supporting, positioning and adjusting a printing-film, held in a suitable frame, over the work or surface to be shaded. In such apparatus, in addition to the rough adjustment or shifting movements permitted by suitable freely-movable supporting carriages with which the film-frame is connected, micrometric means are provided for effecting fine adjustment of the film-frame sidewise and forward or backward. It is customary to support the film-frame pivotally, so that it may be swung up from time to time to expose the work, such tilting and subsequent lowering of the film-frame not disturbing the adjustment effected by the micrometric means. Preferably, the film-frame is carried by a holder, more particularly a clamping holder, which is mounted tiltably on the supporting structure of the machine, to permit of the film-frame being swung up and down. Customarily, this clamping holder engages with pintles mounted on suitable supports. The fine sidewise adjustment of the film-frame has been effected by moving the pintles transversely of the machine by means of a micrometer screw, and the forward or backward fine adjustment of the film-frame has been effected by other micrometer screws arranged to move the pintles forward or backward.

One of the objects of the present invention is to provide novel and effective means for adjusting the film-frame in the forward or backward directions, and especially for effecting simultaneous and equal adjustment at both ends of the film-frame, that is to say, parallel forward or backward adjustment of the film-frame. To this end I employ a slide, movable transversely of the machine under the action of a micrometer screw. This slide produces a movement of the film-frame at right angles to the movement of the slide, by means of inclined portions or wedging surfaces on the slide and on a member or members coöperating therewith. In this way, by means of a single micrometer screw, exact parallel forward or backward adjustment of the film-frame may be effected, and the adjustment when effected is absolutely secure. In accordance with one form of the invention this means simultaneously adjusts the pintles, about which the film-frame tilts to expose the work, to produce the forward or backward movement of the frame. In accordance with another form of the invention the micrometric adjustment for forward or backward movement is interposed between the pintles and the film-frame or the clamping holder for the film-frame, so that the film-frame is adjusted back and forth relatively to the pintles. One of the objects of this form of the invention is to provide a novel combination and arrangement of parts whereby the film-frame or film-frame holder is adjusted forward or backward relatively to the pintles. In this form of the invention I prefer to utilize a compound tiltable bracket comprising two parts, one of which is adapted to engage the pintles, while the other part is the clamping holder for the film-frame; the second part is guided slidably on the first for straight forward or backward movement, and the micrometer screw and the slide engaged thereby are preferably mounted on the first or hinge part.

Another object of my invention is to provide an improved clamping holder for the film-frame. To this end I provide the holder with fixed and movable jaws, and actuate the movable jaws by means of a transversely movable slide having wedge engagement with the slidable jaws, which are guided for straight forward and backward movement, so as to actuate these latter. With this clamping holder the movement of the slide transversely of the machine, and therefore the clamping or releasing of the film-frame is preferably effected by a screw, but other operating devices may be employed. In this way, by means of a single operating screw or device I am enabled to secure simultaneous and equal actuation of any number of movable clamping jaws.

A further object of the invention is to provide a novel and effective structure of relatively adjustable rods and bearing pieces or holders, constituting intermediate supports between the base and the film-frame holder, and improved means for clamping these parts together at the desired relative position, so that a rigid holding will be assured irrespective of wear.

In the accompanying drawings illustrating the invention by means of the preferred embodiments thereof: Figure 1 is a perspective view of a holdfast machine embodying the present invention. The forward flying structure is shown pushed back to its limit of movement; Fig. 2 is a plan view showing the film-frame holder, the member carrying the pintles and the supporting part on which this member is slidable forward and backward; Fig. 3 is a vertical longitudinal section through the supporting part; Fig. 4 is a detail elevation of one of the pintles in its holder; Fig. 5 is a cross-section through Fig. 2; Fig. 6 is a vertical longitudinal section through the other pintle holder, showing the pintle in elevation; Fig. 7 is a view similar to Fig. 2 but showing another form of the invention; Fig. 8 is a vertical longitudinal section through that portion of the compound pivotal bracket which engages with the pintles in this form of the invention; Fig. 9 is a cross-section through the parts shown in Fig. 7; and Fig. 10 is a fragmentary vertical longitudinal section through the holder portion of this compound bracket.

The invention is shown embodied in what is known as the holdfast type of machine, and more particularly in the holdfast machine described and illustrated in my copending application No. 618,571, filed April 3, 1911. It will be understood, however, that the present improvements may be embodied in numerous different forms of apparatus.

10 is a weighted base or holdfast, carrying upright standards 11 at its ends. Vertically traveling carriages 12 are mounted on these standards, and may be operated by a common wheel 13, through connections such as disclosed in the said application, which it is not necessary to illustrate here.

14 is a flying structure, supported by and having an extended range of movement forward or backward relatively to the carriages 12, the said structure preferably comprising telescopic side members 15 and 16, one being slidable in the carriage 12 and the other slidable in the first member, and a transverse way-bar or member 17 mounted at its ends on heads 18 carried by the forward ends of the members 16.

19 is a carriage suitably guided on the way-bar 17 and slidable from side to side of the machine thereon. A transverse rod 20 is mounted slidably in the downward and forward projecting arms of the said carriage. Set screws 21, 22, 23 and 24 serve to lock the parts against movement. The rod 20 may be held against rotation by means of a slot 25 therein, receiving pins or keys 75 on the carriage 19.

26 is a suitable film-frame, and 27, in Figs. 1 and 2, is a film-frame holder, which for purposes of illustration is the same as disclosed in my Patent No. 941,500, dated November 30, 1909. Particular description of this form of clamping holder is not necessary, but it may be observed that it possesses stationary jaws 28 and movable jaws 29, the latter being movable obliquely by reason of wedge pieces 30 thereon received in inclined slots 31 in the plate forming the body of the holder, the wedge pieces, and therefore the movable jaws, being moved by means of a lever 32 engaging a link 33 connecting the wedge pieces. The plate forming the body of the holder or bracket is provided at its ends with sockets for engagement with the pintles 34 and 35, about which the film-frame is tiltable to expose the work.

In accordance with the invention novel means are provided for effecting fine parallel forward or backward adjustment of the film-frame, the said means including a slide movable transversely of the machine on a transversely-extending supporting part under the actuation of a micrometer screw and a member or members coacting with said slide by means of inclined ways or surfaces and guided for straight forward or backward movement. In the particular form of the invention illustrated in Figs. 1 to 3, and 5, such means effects the simultaneous forward or backward adjustment of the pintles 34 and 35. In the particular construction illustrated in these views, a transverse supporting part 36, in the nature of a channeled bar, is supported by the rod 20, preferably by means of apertured lugs 37 secured to the ends of the channeled bar and clamped to the ends of the rod. The pintles 34 and 35 are mounted in suitable holders 38, which may consist of a top wall 39 and depending end walls 40, which end walls are provided with alined bearings for the reception of the pintles. Preferably, these pintle holders 38 are mounted on the ends of a common transverse member or bar 41, which is movable forward and backward relatively to the transverse supporting part 36. The transverse member 41 is provided with rearward extending slide portions 42, which are received in guides 43 formed below the bottom of the channel in the supporting part 36. In the best embodiment of the invention the slide portions 42 are beveled at their side edges to correspond with the undercut sides of the guide-ways. The long transverse slide 44 is mounted in the channel of the supporting part 36. This slide is provided with parallel slotted guide-ways 45 inclined at a slight angle to the length of the slide. These guide-ways receive projections or wedge pieces 46 on the upper sides of the slide portions 42 of the transverse member 41. These wedge pieces are preferably elongated in directions parallel to the guide-ways 45 and have straight parallel side walls. Preferably, the slide 44 is beveled on its longitudinal edges so as to be truly guided in undercut ways 47 formed at the bottom of the channeled support 36. The slide 44 is actuated by means of a micrometer screw 48 provided with an operating wheel 49. The screw is journaled in the supporting part 36 and engages with a nut portion 54 on the slide. An index is provided, preferably by means of a scale 50 on the front of the supporting member 36 and a pointer 51 on the slide 44.

From the foregoing construction it will be obvious that parallel micrometric forward or backward adjustment of the film-frame holder and film-frame may be effected by rotating the index wheel 49 in one direction or the other.

In accordance with the form of the invention shown in Figs. 7 to 10, the relation between the forward and backward micrometric adjusting means and the film-frame and supporting parts is such that the film-frame is adjusted forward or backward relatively to the pintles, instead of with them. In this construction I may mount the pintle holders 38 on the rod 20. I now provide a compound pivotal bracket, comprising a transverse hinge member 52 and a film-frame clamp or holder 27$^a$ which is movable forward or backward relatively to the member 52. The hinge member 52 is provided at its ends with sockets for the reception of the ends of the pintles 34 and 35, and is preferably in the nature of a channeled bar. It has opposed guide-ways 47$^a$ in which the slide 44$^a$ is movable. This slide has parallel inclined ways 45$^a$, receiving wedge pieces 46$^a$ on cross slides 42$^a$, which are guided in ways 43$^a$ formed below the bottom of the channeled bar. The slide 44$^a$ is actuated by a micrometer screw 48$^a$, which is journaled in a bracket 53$^a$ and engages with an internally-threaded piece 54$^a$ on the slide 44$^a$. The member 52 is provided with the scale 50$^a$ with which coöperates a pointer or index mark 51$^a$ on the slide. In this way, by an adjustment similar to that shown in the preceding views, the film-frame holder 27$^a$ may be adjusted forward or backward. The holder 27$^a$ is shown as composed of a body 55, preferably in the nature of a channeled bar, carrying fixed jaws 56 and movable jaws 57. These movable jaws are guided in ways 58 in the body 55, so that these jaws are limited to straight forward or backward movement. A transverse slide 59 is mounted on the body 55, being guided for movement at right angles to the movement of the jaws 57, preferably by means of ways 60 formed in the inner opposed sides of the channeled bar. This slide is provided with spaced, parallel, slotted ways 61, which are inclined with relation to the longitudinal axis of the slide. The movable jaws 57 are provided with projections or wedge pieces 62, which are received in the slotted ways 61. Thus, endwise movement of the slide 59 effects straight forward or backward movement of the movable jaws 57, to clamp or release the film-frame. Various means may be provided for operating the slide 59; but I prefer to employ a screw 63 journaled in the body 55 and engaging a nut portion 64 on the slide 59.

The sidewise micrometric adjustment of the film-frame is preferably effected by adjusting the pintles 34 and 35. Preferably, one of the pintles, as 34, may be acted on by a spring 65 which tends to project the same. The other pintle may be adjusted endwise by means of an internally-threaded wheel 66, which engages a threaded portion 67 on the pintle 35. This wheel 66 is preferably an index wheel, being provided with suitable graduations 68. A spring 74 may coöperate with the nut 66, to operate the pintle 35 and to take up backlash. This pintle may have a guide block 69 secured thereto and provided with a projection 70 entering a slot in the holder 38.

In connection with the rod 20 and the arms of the carriage 19, which constitute bearings for the rod, I have shown a very desirable construction for clamping such intermediate and relatively adjustable supporting parts together, in such manner as to insure a rigid holding irrespective of wear. To this end I cut away the rod at one side, as by flattening one side of the cylindrical rod, as shown at 76, thus leaving a space in the bearing opposite this cut-away portion. A set screw, such as the set-screw 24 is arranged to bear against the opposite side of the rod, so as to force the edges of this cut-away portion against the wall of the bearing. In this way a very tight grip is effected; and as the parts wear in use, the rod will always be let down to new, spaced bearing surfaces, so that there will be no tendency of the rod to wabble in the bearing. Where a key or the like is employed to keep the rod and bearing from relative turning, it is very desirable to place it opposite the screw. To this end, I have shown the key-way 25 formed in the cut-away portion of the rod. With this construction, the key-way being sufficiently deep, the key does not prevent the rod being forced down in the bearing as wear proceeds, and it does prevent the rod from turning in the bearing, so that the screw will always be opposite the cut-away portion, that is, in proper position to force the edges of this portion against the wall of the bearing.

What I claim is:

1. In a machine for utilizing printing-films, the combination with a film-frame holder, and means for supporting and permitting tilting of said holder, of mechanism for effecting simultaneous and equal parallel micrometric forward or backward adjustment of both sides of said holder, comprising members having inclined interengaging portions and micrometric screw means for moving one of said members transversely of the machine.

2. In a machine for utilizing printing-films, the combination of a base, a support, means between said base and support for adjusting the support toward and from the work, a tiltable film-frame holder sustained from said support, and mechanism for effecting simultaneous and equal parallel micrometric forward or backward adjustment of both sides of said holder relative to the support, the same including members one of which has inclined ways engaged by the other, and a micrometer screw for moving one of said members transversely of the machine.

3. In a machine for utilizing printing-films, a base, a support carried by the base and movable relatively to the work, a film-frame holder, a pair of pintles on which said holder is pivoted, and mechanism for effecting simultaneous micrometric forward or backward adjustment of said pintles, comprising a member guided for straight forward or backward movement on said support, a transversely movable slide having an inclined way whereby it produces forward or backward movement of said member, and a micrometer screw for moving the slide.

4. In a machine for supporting and adjusting a film-frame over the work, a support, and mechanism for effecting simultaneous and equal micrometric forward or backward adjustment of both sides of the film-frame, comprising members mounted slidably on said support and guides on said support confining the members to movement at right angles to each other, said members having interengaging inclined portions, and a micrometer screw connected to one of said members.

5. In a machine for supporting and adjusting a film-frame over the work, a support, means for adjusting the same relatively to the work, a pivoted holder for the film frame and mechanism for effecting simultaneous and equal micrometric forward or backward adjustment of both sides of the holder, comprising a member guided on said support for straight forward or backward movement, a member slidable transversely on said support, one of said members having an inclined slotted way and the other member having a portion received therein, and a micrometer screw connected with the second member.

6. In a machine for supporting and adjusting a film-frame over the work, a support adjustable with reference to the work, a pivoted holder for the film frame and mechanism for effecting simultaneous and equal micrometric forward or backward adjustment of both sides of the holder, comprising a member movable transversely on said support and having an inclined slotted way, a micrometer screw for moving the same, and a member guided for straight forward or backward movement on said support having a projection received in said way.

7. In a machine for supporting and adjusting a film-frame over the work, a transversely extending support adjustable with reference to the work, and mechanism for effecting parallel micrometric forward or backward adjustment of the film-frame, comprising a transversely extending slide mounted on said support, a transversely extended member having spaced slide projections entering guides in said support and crossing said slide, said slide and slide projections having parallel inclined interengaging portions, and a screw arranged to move said slide endwise.

8. In a machine for supporting and adjusting a film-frame over the work, a transversely extending part, and mechanism for effecting parallel micrometric forward or backward adjustment of the film-frame, comprising a transversely extending slide mounted and guided on said part and having parallel inclined slotted ways formed therein, a transversely extended member having spaced slide projections perpendicular to said slide and entering guides in said part and having wedge pieces received in said slotted ways, and a micrometer screw for effecting longitudinal movement of said slide.

9. In a machine for supporting and adjusting a film-frame over the work, a transversely extending part having a longitudinal slide-way and slide-ways below and crossing the same at right angles, cross slides entering the cross slide-ways and provided with upward projecting wedge pieces, a long slide mounted in said longitudinal slide-way over said cross slides and having inclined ways receiving said wedge pieces, and an operating screw connected to said long slide.

10. In a machine for supporting and adjusting a film-frame over the work, a transversely extending part adjustable relatively to the work, and mechanism for effecting parallel micrometric forward or backward adjustment of the film-frame, comprising a transversely extending slide mounted on said part, cross-slides entering guides in said part, said longitudinal and cross slides having parallel inclined interengaging portions, and an operating screw connected with said transversely extending slide.

11. In a machine for supporting and adjusting a film-frame over the work, a transversely extending part, and mechanism for effecting parallel micrometric forward or backward adjustment of the film-frame, comprising a transversely extending slide mounted and guided on said part and having parallel inclined slotted ways formed therein, cross-slides entering guides in said part and having projections received in said ways, and an operating screw connected with said transversely extending slide.

12. In a machine for utilizing printing-films, a film-frame holder, pivotal supporting means adjacent said holder about which the holder with the film-frame may be tilted to expose the work, said holder being movable forward or backward relatively to said pivotal supporting means, and micrometric means for effecting such movement of said holder.

13. In a machine for utilizing printing-films, the combination of a base, a support, means between the base and support for adjusting the support relatively to the work, spaced pintles carried by said support, a member adapted to engage said pintles, a film-frame holder supported by said member, and micrometric means for adjusting said holder backward and forward relatively to said member.

14. In a machine for utilizing printing-films, in combination with a supporting part, a tiltable film-frame carrier, comprising a pivotal member having hinge connection with said supporting part, a clamping film-frame holder supported by and tiltable with said pivotal member, and micrometric means for effecting fine adjustment of said holder forward or backward relatively to said pivotal member.

15. In a machine for utilizing printing-films, a base, an adjustable support sustained thereby and carrying spaced pintles, and a tiltable film-frame carrier comprising a pivotal member adapted to engage said pintles, a clamping film-frame holder having rearwardly extending slide portions supported and guided in said pivotal member, a transverse slide guided on said pivotal member, said slide and slide portions having coöperating wedging surfaces constructed and arranged gradually to project or retract said holder, and an operating screw connected with said transverse slide.

16. In a machine for utilizing printing-films, a clamping film-frame holder comprising a body part having fixed and slidable jaws thereon, a slide movable on said body part transversely of the machine and relatively to the slidable jaws, said slidable jaw and slide having coöperating inclined surfaces adapted to project or retract the jaw, and operating means for moving said slide.

17. In a machine for utilizing printing-films, a clamping film-frame holder comprising a body part having fixed and slidable jaws thereon, said body part having guiding means confining said slidable jaw to straight forward or backward movement, a slide movable on said body part transversely of the machine and relatively to the slidable jaws and having wedging means whereby it projects or retracts the slidable jaw, and operating means for moving said slide.

18. In a machine for utilizing printing-films, a clamping film-frame holder comprising a body part having fixed jaws thereon, slidable jaws mounted and guided on the body part for straight forward or backward movement with reference to the fixed jaws, a transverse slide common to both slidable jaws mounted and guided on said body part, said slide and slidable jaws being provided with parallel wedging surfaces whereby movement of the slide transversely of the slidable jaws projects or retracts the latter, and means for moving said slide.

19. In a machine for utilizing printing-films, a clamping film-frame holder comprising a body part having fixed jaws thereon, slidable jaws mounted and guided on the body part for straight forward or backward movement with reference to the fixed jaws, a transverse slide common to both slidable jaws mounted and guided on said body part and having spaced parallel inclined slotted ways, said slidable jaws having projections received in said ways, and operating means for moving said slide transversely of the slidable jaws.

20. In a micrometric film-frame holding and adjusting machine, the combination of supporting parts comprising a cylindrical rod cut away at one side, a bearing formed to receive the rod and to leave a space opposite the cut-away portion, a screw arranged to bear against the opposite side of the rod to force the edges of the cut-away portion of the rod against the wall of the bearing, and a key opposite the screw holding the rod against rotation.

21. In a micrometric film frame holding and adjusting machine, the combination of supporting parts comprising a cylindrical rod cut away at one side and provided with a slotted key-way in this side, a bearing formed to receive the rod and to leave a space opposite the cut-away portion, a screw arranged to bear against the opposite side of the rod to force the edges of the cut-away portion of the rod against the wall of the bearing, and a key carried by the bearing opposite the screw and entering said key-way.

22. In a micrometric film-frame holding and adjusting machine, the combination with a base, and a film-frame holder, of an intermediate adjustable supporting rod, a bearing in which said rod is received, said rod and bearing being relatively adjustable in an axial direction and said rod being cut away at one side so as to leave a space between this side and the wall of the bearing, and a screw arranged to bear against the opposite side of the rod to force the edges of said cut-away portion against the wall of the bearing.

In testimony whereof, I have signed my name to this specification, in the presence of two subscribing witnesses.

BENJAMIN DAY.

Witnesses:
LOUELLA F. LITTLE,
D. HAROLD BUSH.

Copies of this patent may be obtained for five cents each, by addressing the "Commissioner of Patents, Washington, D. C."